(12) United States Patent
Morris et al.

(10) Patent No.: US 12,466,047 B2
(45) Date of Patent: Nov. 11, 2025

(54) POWER TOOLS INCLUDING A PLURALITY OF TEMPERATURE SENSORS

(71) Applicant: MILWAUKEE ELECTRIC TOOL CORPORATION, Brookfield, WI (US)

(72) Inventors: Garron K. Morris, Whitefish Bay, WI (US); Timothy J. Strandt, New Berlin, WI (US); Radhakrishnan Sivakumar, Wauwatosa, WI (US); Read F. Hedl, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/608,037

(22) Filed: Mar. 18, 2024

(65) Prior Publication Data

US 2024/0316745 A1   Sep. 26, 2024

Related U.S. Application Data

(60) Provisional application No. 63/453,881, filed on Mar. 22, 2023.

(51) Int. Cl.
  *B25F 5/00* (2006.01)
  *H02J 7/00* (2006.01)

(52) U.S. Cl.
  CPC ............. *B25F 5/00* (2013.01); *H02J 7/00038* (2020.01); *H02J 7/0042* (2013.01); *H02J 7/0063* (2013.01)

(58) Field of Classification Search
  CPC .... B25F 5/00; B25F 5/001; B25F 5/02; B25C 1/06; B25C 1/008; H02H 7/08;
  (Continued)

(56) References Cited

U.S. PATENT DOCUMENTS 5,493,199 A * 2/1996 Koenck ............... H02J 7/00038
                                                           320/152
6,229,280 B1 * 5/2001 Sakoh ................. H02J 7/00047
                                                           320/114
(Continued)

FOREIGN PATENT DOCUMENTS

CN      110058122 A    7/2019
DE   102007005670 A1   8/2008
(Continued)

OTHER PUBLICATIONS

Extended European Search Report for Application No. 24165268.4 dated Aug. 27, 2024 (9 pages).

*Primary Examiner* — Scott A Smith
(74) *Attorney, Agent, or Firm* — Michael Best & Friedrich LLP

(57) ABSTRACT

Systems and methods for implementing a plurality of temperature sensors in power tools. An example power tool includes a first electrical component, a second electrical component, and an indication device. The power tool includes a first temperature sensor configured to sense a temperature of the first electrical component, and a second temperature sensor configured to sense a temperature of the second electrical component. A controller is connected to the first temperature sensor and the second temperature sensor. The controller is configured to determine a temperature difference between a first temperature value associated with the first temperature sensor and a second temperature value associated with the second temperature sensor, compare the temperature difference to a temperature difference threshold, and provide, when the temperature difference satisfies the temperature difference threshold, a notification using the indication device.

20 Claims, 12 Drawing Sheets

(58) Field of Classification Search
CPC .......................... H02H 7/0852; H01M 10/425; H02J 7/00041; H02J 7/0047; H02J 7/00038; H02J 7/0042; H02J 7/0063
USPC ........... 173/1, 2, 176, 178, 217; 318/400.22, 318/400.35; 320/114, 136, 150, 152
See application file for complete search history.

(56) References Cited

U.S. PATENT DOCUMENTS

| | | | |
|---|---|---|---|
| 7,095,235 B2 | 8/2006 | Fiebig et al. | |
| 7,446,493 B2 | 11/2008 | Forster et al. | |
| 7,551,411 B2 | 6/2009 | Woods et al. | |
| 7,817,384 B2 | 10/2010 | Woods et al. | |
| 8,657,031 B2 | 2/2014 | Kononenko et al. | |
| 9,186,787 B2 | 11/2015 | Noda et al. | |
| 9,577,450 B2 * | 2/2017 | Yoshikawa | H02J 7/342 |
| 9,855,060 B2 | 1/2018 | Ardel et al. | |
| 9,869,722 B1 | 1/2018 | Morris | |
| 10,046,429 B2 | 8/2018 | Stock et al. | |
| 10,827,655 B2 * | 11/2020 | Truettner | H02J 7/0042 |
| 11,095,142 B2 | 8/2021 | Geng et al. | |
| 11,221,611 B2 | 1/2022 | Abbott et al. | |
| 11,476,790 B2 | 10/2022 | Ichikawa et al. | |
| 11,518,012 B2 | 12/2022 | Takeuchi et al. | |
| 2004/0135553 A1 * | 7/2004 | Sakakibara | H01M 10/486 320/150 |
| 2007/0193762 A1 * | 8/2007 | Arimura | B25F 5/00 173/217 |
| 2008/0203995 A1 * | 8/2008 | Carrier | H01M 10/425 320/135 |
| 2008/0309289 A1 * | 12/2008 | White | H02J 7/0063 320/136 |
| 2013/0033790 A1 * | 2/2013 | Kobayakawa | H01M 10/48 361/87 |
| 2013/0108904 A1 | 5/2013 | Okabayashi | |
| 2016/0184952 A1 | 6/2016 | Kabza et al. | |
| 2016/0361070 A1 | 12/2016 | Ardel et al. | |
| 2018/0331768 A1 | 11/2018 | Szell | |
| 2019/0085812 A1 * | 3/2019 | Klatt | F02D 41/22 |
| 2019/0250206 A1 | 8/2019 | Noguchi et al. | |
| 2021/0119514 A1 * | 4/2021 | Cox | H02K 11/0094 |
| 2021/0184609 A1 | 6/2021 | Prescher | |
| 2021/0240145 A1 | 8/2021 | Abbott | |
| 2021/0391741 A1 * | 12/2021 | Rigdon | H02J 7/005 |
| 2022/0029433 A1 | 1/2022 | Osswald et al. | |
| 2022/0029437 A1 | 1/2022 | Osswald et al. | |
| 2022/0052542 A1 | 2/2022 | Haldar et al. | |
| 2022/0128973 A1 | 4/2022 | Abbott et al. | |
| 2022/0137147 A1 | 5/2022 | Westerby et al. | |
| 2022/0299946 A1 | 9/2022 | Abbott et al. | |

FOREIGN PATENT DOCUMENTS

| | | |
|---|---|---|
| DE | 102017008756 A1 | 3/2019 |
| DE | 102018206892 A1 | 11/2019 |
| DE | 102018119134 A1 | 2/2020 |
| DE | 102018221411 A1 | 6/2020 |
| DE | 102020211311 A1 | 3/2022 |
| EP | 3849076 A1 | 7/2021 |
| WO | 2008156567 A1 | 12/2008 |
| WO | 2010023246 A1 | 3/2010 |
| WO | 2022033756 A1 | 2/2022 |
| WO | 2022193208 A1 | 9/2022 |

\* cited by examiner

POWER TOOLS INCLUDING A PLURALITY OF TEMPERATURE SENSORS

RELATED APPLICATIONS

This application claims the benefit of U.S. Provisional Patent Application No. 63/453,881, filed Mar. 22, 2023, the entire content of which is hereby incorporated by reference.

FIELD

This application relates to systems and methods for implementing a plurality of temperature sensors in power tools.

SUMMARY

Power tool devices described herein include a first electrical component, a second electrical component, and an indication device. The power tool includes a first temperature sensor configured to sense a temperature of the first electrical component, and a second temperature sensor configured to sense a temperature of the second electrical component. A controller is connected to the first temperature sensor and the second temperature sensor. The controller is configured to determine a temperature difference between a first temperature value associated with the first temperature sensor and a second temperature value associated with the second temperature sensor, compare the temperature difference to a temperature difference threshold, and provide, when the temperature difference satisfies the temperature difference threshold, a notification using the indication device.

In some aspects, the power tool device is a power tool, the first electrical component in a motor, and the second electrical component is a switching network configured to drive the motor.

In some aspects, the controller is further configured to limit, in response to the temperature difference satisfying the temperature difference threshold, current provided to the motor.

In some aspects, the temperature difference threshold is a high temperature threshold and the notification is indicative of a high temperature condition.

In some aspects, the temperature difference threshold is a low temperature threshold and the notification is indicative of a low temperature condition.

In some aspects, the controller is further configured to determine a first running mean of the first temperature value and a second running mean of the second temperature value over a time period, determine a first standard deviation of the first temperature value and a second standard deviation of the second temperature value over the time period, and predict an error of the power tool based on the first running mean, the second running mean, the first standard deviation, and the second standard deviation.

In some aspects, the controller is further configured to determine a running mean of the temperature difference over a time period, determine a standard deviation of the temperature difference over the time period, and predict an error of the power tool based on the running mean and the standard deviation of the temperature difference over the time period.

In some aspects, the first electrical component is a first direct current ("DC") bus capacitor, and the second electrical component is a second DC bus capacitor.

In some aspects, the controller is further configured to determine a degradation value of the first electrical component, compare the degradation value of the first electrical component to a degradation threshold, and provide, in response to the degradation value satisfying the degradation threshold, a second notification using the indication device.

Power tool devices described herein include an electrical component, an indication device, a first temperature sensor configured to sense an ambient temperature, a second temperature sensor configured to sense a temperature of the electrical component, and a controller connected to the first temperature sensor and the second temperature sensor. The controller is configured to determine a temperature difference between a first temperature value associated with the first temperature sensor and a second temperature value associated with the second temperature sensor, calculate an amount of heat generated by the electrical component, compare the temperature difference and the amount of heat generated by the electrical component to a look-up table, and provide, in response to the comparison indicating an abnormal temperature condition of the electrical component, a notification using the indication device.

In some aspects, the electrical component is a capacitor.

In some aspects, the power tool device is a power tool, and the power tool device further includes a motor, a battery pack, and a switching network configured to provide power from the battery pack to the motor. The controller is configured to calculate the amount of heat generated by the electrical component based on a function of an operating frequency of the switching network.

In some aspects, the controller is further configured to limit, in response to the comparison indicating an abnormal temperature condition, current provided to the motor.

In some aspects, the controller is configured to calculate the amount of heat generated by the electrical component based further on an operating speed of the motor.

In some aspects, the controller is further configured to log the abnormal temperature condition of the electrical component in a memory.

In some aspects, to determine a temperature difference between a first temperature value associated with the first temperature sensor and a second temperature value associated with the second temperature sensor, the controller is configured to estimate the ambient temperature upon a startup of the power tool device.

Methods for controlling a power tool device described herein include determining a temperature difference between a first temperature value associated with a first temperature sensor and a second temperature value associated with a second temperature sensor, wherein the first temperature sensor is configured to sense an ambient temperature, and wherein the second temperature sensor is configured to sense a temperature of an electrical component. The method includes calculating an amount of heat generated by the electrical component, comparing the temperature difference and the amount of heat generated by the electrical component to a look-up table, and providing, in response to the comparison indicating an abnormal temperature condition of the electrical component, a notification using an indication device.

In some aspects, calculating the amount of heat generated by the electrical component is based on a function of an operating frequency of a switching network used to control a motor.

In some aspects, the method includes limiting, in response to the comparison indicating an abnormal temperature condition, current provided to the motor.

In some aspects, calculating the amount of heat generated by the electrical component is based further on an operating speed of the motor.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Accordingly, in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

Other features and aspects will become apparent by consideration of the following detailed description and accompanying drawings.

DETAILED DESCRIPTION

Figure 1:
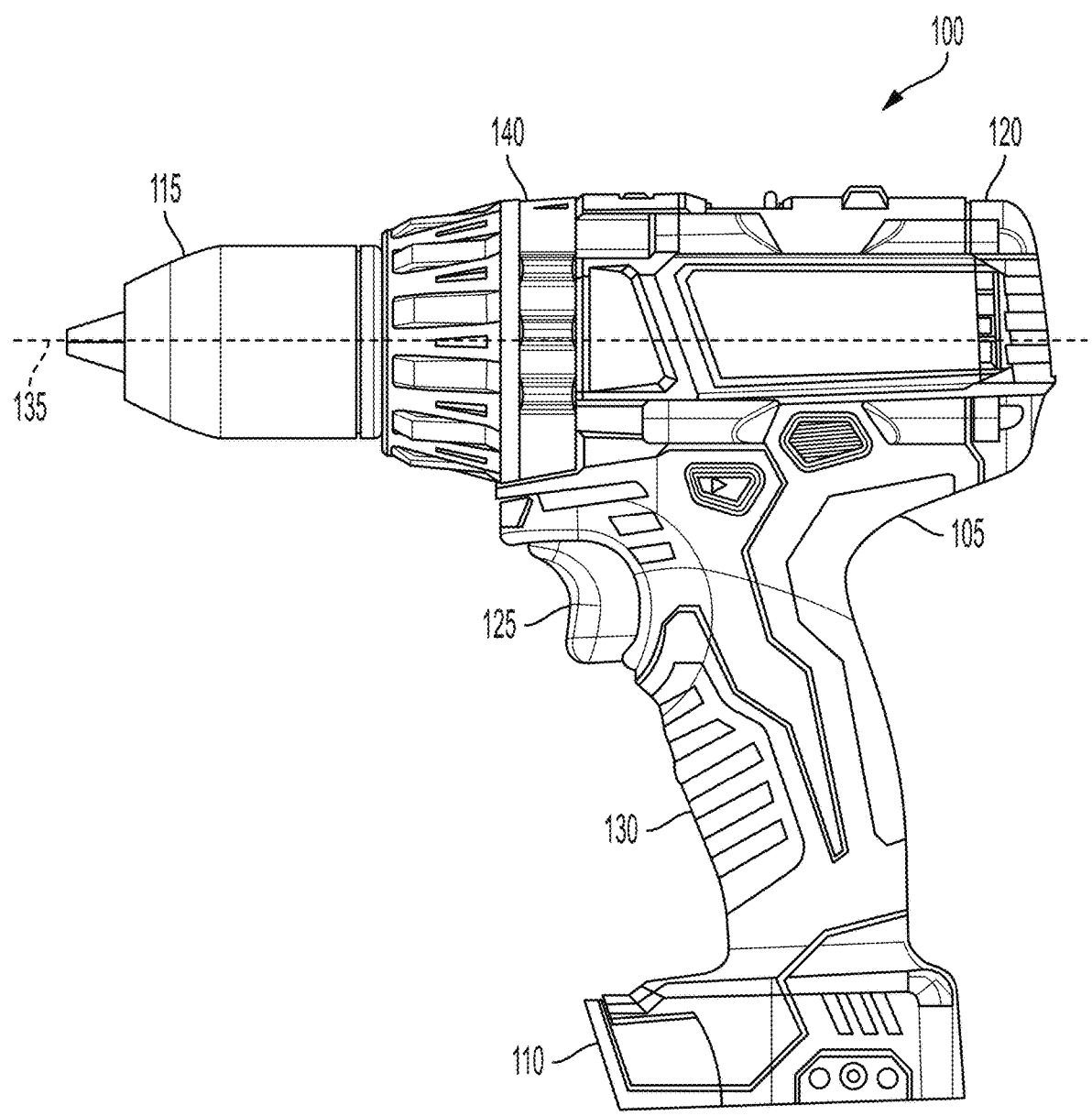
FIG. 1 illustrates a power tool in accordance with embodiments described herein.

FIG. 1 illustrates an example power tool device or power tool 100 including a plurality of temperature sensors, according to some embodiments. The power tool 100 includes a housing 105, a battery pack interface 110, a driver 115 (e.g., a chuck, bit holder, etc.), a motor housing 120, a trigger 125, a handle 130, and an input device 140. The motor housing 120 houses a motor 250 (see FIG. 2). In some embodiments, a longitudinal axis 135 extends from the driver 115 through a rear of the motor housing 120. During operation, the driver 115 rotates about the longitudinal axis 135. The longitudinal axis 135 may be approximately perpendicular with the handle 130. While FIG. 1 illustrates a specific power tool 100 with a rotational output, it is contemplated that the temperature sensors described herein may be used with multiple types of power tools, such as drills, drivers, powered screw drivers, powered ratchets, grinders, right angle drills, rotary hammers, pipe threaders, or another type of power tool that experiences rotation about an axis (e.g., longitudinal axis 135). In some embodiments, the power tool 100 is a power tool that experiences translational movement along the longitudinal axis 135, such as reciprocal saws, chainsaws, pole-saws, circular saws, cut-off saws, die-grinder, and table saws.

Figure 2:
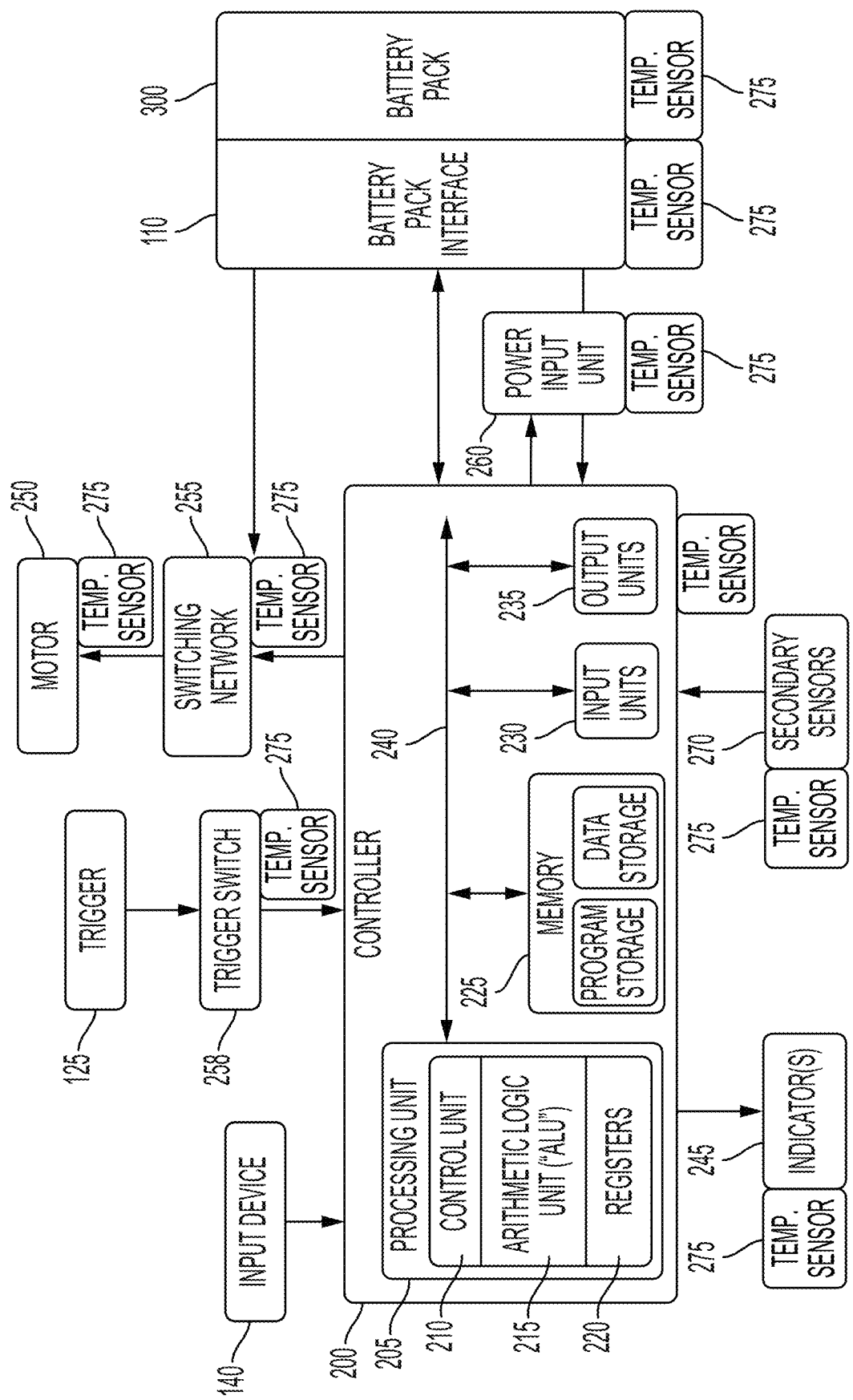
FIG. 2 illustrates a block diagram of a controller for the power tool of FIG. 1 in accordance with embodiments described herein.

A power tool controller 200 for the power tool 100 is illustrated in FIG. 2. The power tool controller 200 is electrically and/or communicatively connected to a variety of modules or components of the power tool 100. For example, the illustrated power tool controller 200 is connected to indicators 245, a power switching network 255, the trigger 125 (via a trigger switch 258), a power input unit 260, secondary sensor(s) 270 (e.g., a current sensor, a voltage sensor, a speed sensor, etc.), and a plurality of temperature sensors 275.

The power tool controller 200 includes a plurality of electrical and electronic components that provide power, operational control, and protection to the components and modules within the power tool controller 200 and/or power tool 100. For example, the power tool controller 200 includes, among other things, a processing unit 205 (e.g., a microprocessor, an electronic processor, an electronic controller, a microcontroller, or another suitable programmable device), a memory 225, input units 230, and output units 235. The processing unit 205 includes, among other things, a control unit 210, an arithmetic logic unit ("ALU") 215, and a plurality of registers 220 (shown as a group of registers in FIG. 2), and is implemented using a known computer architecture (e.g., a modified Harvard architecture, a von Neumann architecture, etc.). The processing unit 205, the memory 225, the input units 230, and the output units 235, as well as the various modules connected to the power tool controller 200 are connected by one or more control and/or data buses (e.g., common bus 240). The control and/or data buses are shown generally in FIG. 2 for illustrative purposes. The use of one or more control and/or data buses for the interconnection between and communication among the various modules and components would be known to a person skilled in the art in view of the embodiments described herein.

The memory 225 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 205 is connected to the memory 225 and executes software instructions that are capable of being stored in a RAM of the memory 225 (e.g., during execution), a ROM of the memory 225 (e.g., on a generally permanent basis), or another non-transitory computer readable medium such as another memory or a disc. Software included in the implementation of the power tool 100 can be stored in the memory 225 of the power tool controller 200. The software includes, for example, firmware, one or more applications, program data, filters, rules, one or more program modules, and other executable instructions. The power tool controller 200 is configured to retrieve from the memory 225 and execute, among other things, instructions related to the control processes and methods described herein. In other embodiments, the power tool controller 200 includes additional, fewer, or different components.

The power tool controller 200 drives the motor 250 to rotate the driver 115 in response to a user's actuation of the trigger 125. The driver 115 may be coupled to the motor 250 via an output shaft. Depression of the trigger 125 actuates a trigger switch 258, which outputs a signal to the power tool controller 200 to drive the motor 250, and therefore the driver 115. In some embodiments, the power tool controller 200 controls the power switching network 255 (e.g., a FET switching bridge) to drive the motor 250. For example, the power switching network 255 may include a plurality of high side switching elements (e.g., FETs) and a plurality of low side switching elements (e.g., FETs). The power tool controller 200 may control each switching element of the plurality of high side switching elements and the plurality of low side switching elements to drive each phase of the motor 250 (e.g., three phases). For example, the power switching network 255 may be controlled to more quickly deaccelerate the motor 250.

The indicators 245 are also connected to the power tool controller 200 and receive control signals from the power tool controller 200 to turn on and off or otherwise convey information based on different states of the power tool 100. The indicators 245 include, for example, one or more light-emitting diodes (LEDs), or a display screen. The indicators 245 can be configured to display conditions of, or information associated with, the power tool 100. For example, the indicators 245 can display information relating to an operational state of the power tool 100, such as a mode or speed setting. The indicators 245 may also display information relating to a fault condition, or other abnormality of the power tool 100. In addition to or in place of visual indicators, the indicators 245 may also include a speaker or a tactile feedback mechanism to convey information to a user through audible or tactile outputs. In some embodiments, the indicators 245 display information relating to whether the power tool 100 is experiencing a high temperature condition or a low temperature condition, as described below in more detail.

The battery pack interface 110 is connected to the power tool controller 200 and is configured to couple with a battery pack 300. The battery pack interface 110 includes a combination of mechanical (e.g., a battery pack receiving portion) and electrical components configured to and operable for interfacing (e.g., mechanically, electrically, and communicatively connecting) the power tool 100 with the battery pack 300. The battery pack interface 110 is coupled to the power input unit 260. The battery pack interface 110 transmits the power received from the battery pack 150 to the power input unit 260. The power input unit 260 includes active and/or passive components (e.g., voltage step-down controllers, voltage converters, rectifiers, filters, etc.) to regulate or control the power received through the battery pack interface 110 and to the power tool controller 200. In some embodiments, the battery pack interface 110 is also coupled directly or indirectly to the power switching network 255. The operation of the power switching network 255, as controlled by the power tool controller 200, determines how power is supplied to the motor 250.

The input device 140 is operably coupled to the power tool controller 200 to, for example, select a forward mode of operation, a reverse mode of operation, a torque setting for the power tool 100, and/or a speed setting for the power tool 100 (e.g., using torque and/or speed switches), etc. In some embodiments, the input device 140 includes a combination of digital and analog input or output devices required to achieve a desired level of operation for the power tool 100, such as one or more knobs, one or more dials, one or more switches, one or more buttons, etc. In other embodiments, the input device 140 is configured as a ring (e.g., a torque ring). Movement of the input device 140 sets a desired torque and/or desired a speed value at which to drive the motor 250.

The secondary sensor(s) 270 may include current sensors, speed sensors, position sensors (e.g., Hall effect sensors), voltage sensors, torque sensors, motion sensors, temperature sensors, and the like, to detect additional conditions of the power tool 100. The power tool 100 also includes a plurality of temperature sensors 275 connected to various components of the power tool 100. For example, the plurality of temperature sensors 275 may sense the temperature of the trigger switch 258, the switching network 255, the motor 250, the indicators 245, the secondary sensors 270, the power input unit 260, the battery pack interface 110, the battery pack 300, and/or the controller 200. In some instances, a temperature sensor 275 is provided adjacent to each switching element included in the switching network 255. Additional temperature sensors 275 may be provided in addition to or in place of those illustrated. For example, temperature sensors 275 may be placed adjacent to individual electrical components (e.g., resistors, capacitors, inductors, etc.) included in controller 200, the indicators 245, the power input unit 260, and the like. While connections between the plurality of temperature sensors 275 and the controller 200 are not explicitly illustrated in FIG. 2 for the sake of clarity, each temperature sensor 275 is wired or wirelessly connected to the controller 200. Additional temperature sensors 275 may be situated within the battery pack 300.

Figure 3:
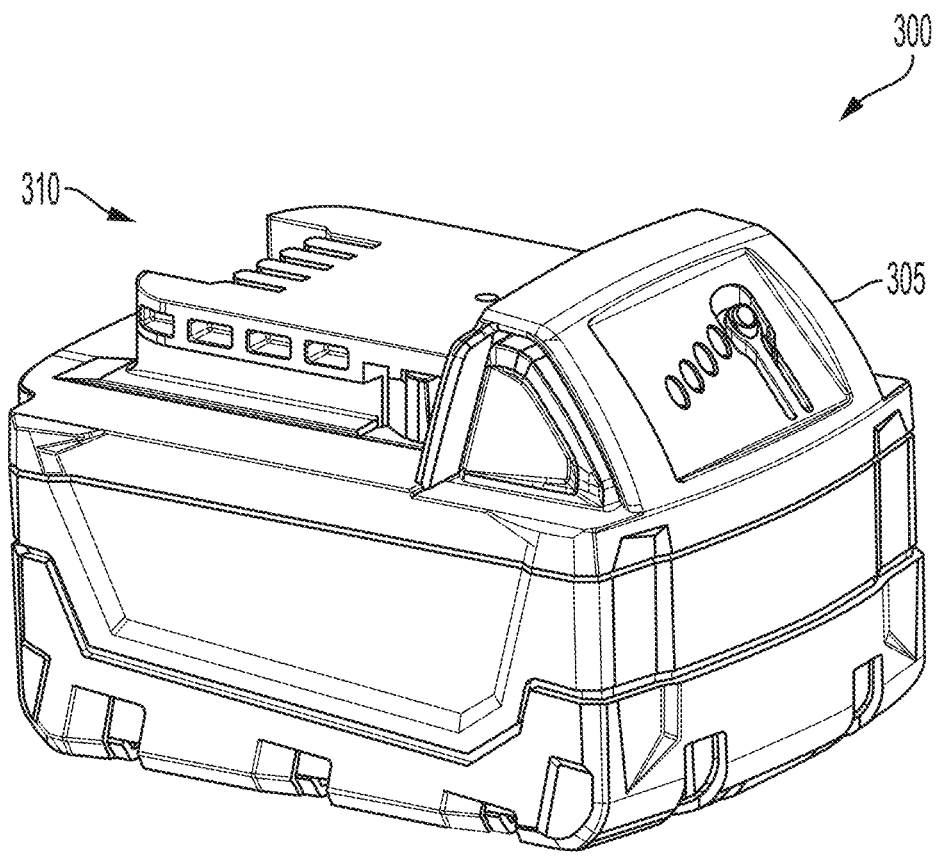
FIG. 3 illustrates a power tool battery pack in accordance with embodiments described herein.

FIG. 3 illustrates a power tool device as the battery pack 300 according to some embodiments. The battery pack 300 includes a battery pack housing 305 and a power tool interface 310. The power tool interface 310 is configured to couple the battery pack 300 to a power tool device, such as the power tool 100. The battery pack 300 provides the power tool 100 with power using the power tool interface 310.

Figure 4:
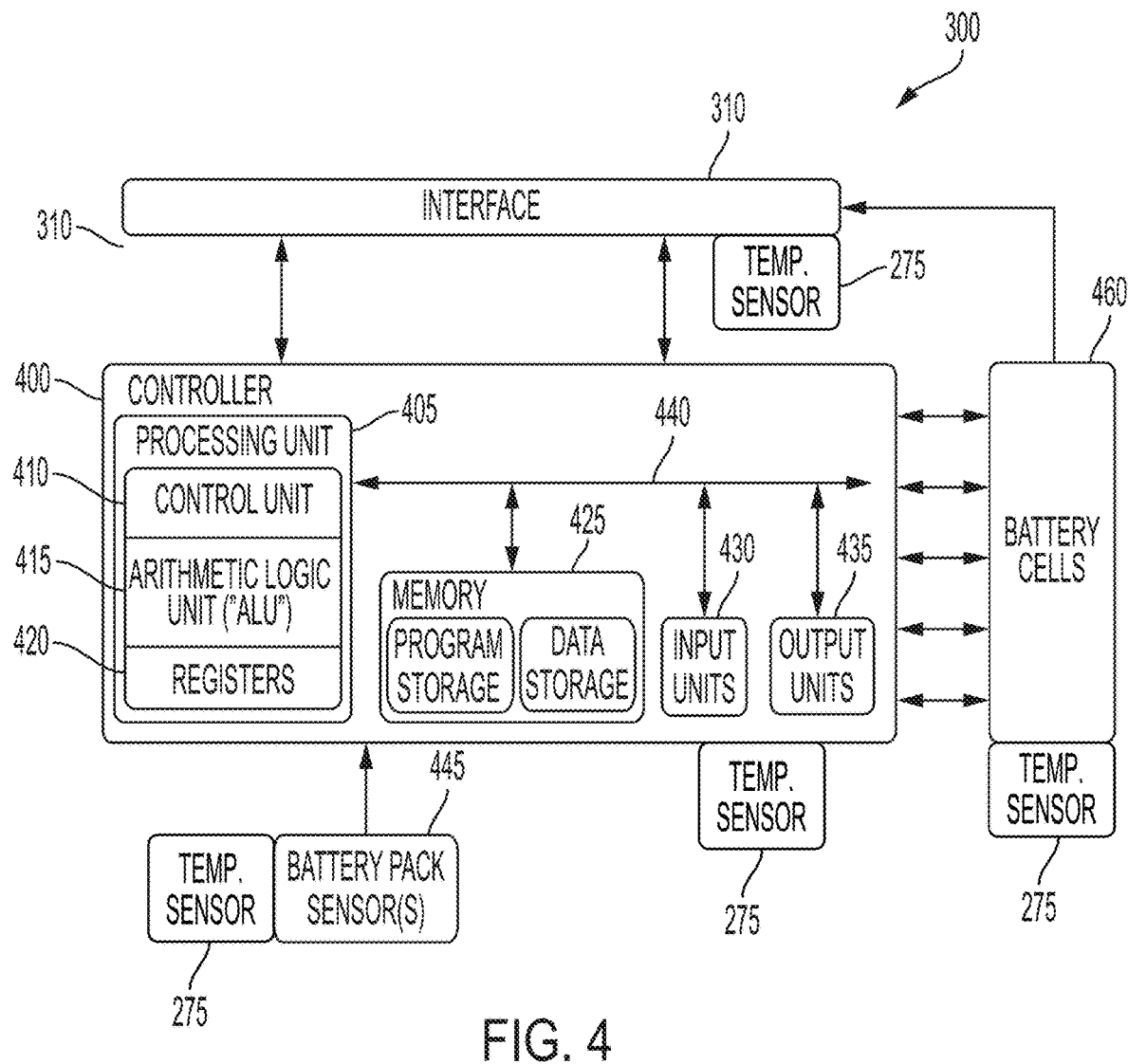
FIG. 4 illustrates a block diagram of a controller for the battery pack of FIG. 3 in accordance with embodiments described herein.

A battery pack controller 400 for the battery pack 300 is illustrated in FIG. 4. The battery pack controller 400 is electrically and/or communicatively connected to a variety of modules or components of the battery pack 300. For example, the illustrated battery pack controller 400 is connected to one or more battery pack sensors 445, one or more battery cell(s) 460, and the power tool interface 310.

The battery pack controller 400 includes a plurality of electrical and electronic components that provide power, operational control, and protection to the components and modules within the battery pack controller 400 and/or battery pack 300. For example, the battery pack controller 400 includes, among other things, a processing unit 405 (e.g., a microprocessor, an electronic processor, an electronic controller, a microcontroller, or another suitable programmable device), a memory 425, input units 430, and output units 435. The processing unit 405 includes, among other things, a control unit 410, an arithmetic logic unit ("ALU") 415, and a plurality of registers 420 (shown as a group of registers in FIG. 4), and is implemented using a known computer architecture (e.g., a modified Harvard architecture, a von Neumann architecture, etc.). The processing unit 405, the memory 425, the input units 430, and the output units 435, as well as the various modules connected to the battery pack controller 400 are connected by one or more control and/or data buses (e.g., common bus 440). The control and/or data buses are shown generally in FIG. 4 for illustrative purposes. The use of one or more control and/or data buses for the interconnection between and communication among the various modules and components would be known to a person skilled in the art in view of the embodiments described herein.

The memory 425 is a non-transitory computer-readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 405 is connected to the memory 425 and executes software instructions that are capable of being stored in a RAM of the memory 425 (e.g., during execution), a ROM of the memory 425 (e.g., on a generally permanent basis), or another non-transitory computer-readable medium such as another memory or a disc. Software included in the implementation of the battery pack 300 can be stored in the memory 425 of the battery pack controller 400. The software includes, for example, firmware, one or more applications, program data, filters, rules, one or more program modules, and other executable instructions. The battery pack controller 400 is configured to retrieve from the memory 425 and execute, among other things, instructions related to the control processes and methods described herein. In other embodiments, the battery pack controller 400 includes additional, fewer, or different components.

In some embodiments, the battery pack controller 400 is powered by the one or more battery cell(s) 460, and provides power (e.g., current and voltage) to the power tool interface 310 using the one or more battery cell(s) 460. The battery pack sensor(s) 445 are configured to monitor charge voltage, charge current, discharge voltage, and discharge current of the one or more battery cell(s) 460. The battery pack 300 may also include one or more of the plurality of temperature sensors 275. For example, temperature sensors 275 may be situated adjacent to the battery cell(s) 460, the power tool interface 310, the battery pack sensors 445, and/or the battery pack controller 400. The temperatures indicated by the temperature sensors 275 within the battery pack 300 may be communicated to the power tool controller 200 via one or more terminals of the power tool interface 310.

The temperatures detected by the plurality of temperature sensors 275 may be monitored by the power tool controller 200 to detect errors and potential failures (e.g., predicted failures) of the power tool 100 and/or the battery pack 300. For example, temperature differences between any two sensors may be calculated and compared against expected temperature rises for calculated heat losses given real-time tool operating conditions (for example, duty cycle [% PWM] of the switching network 255, rotations per minute [RPM] of the motor 250, etc.).

Figure 5:
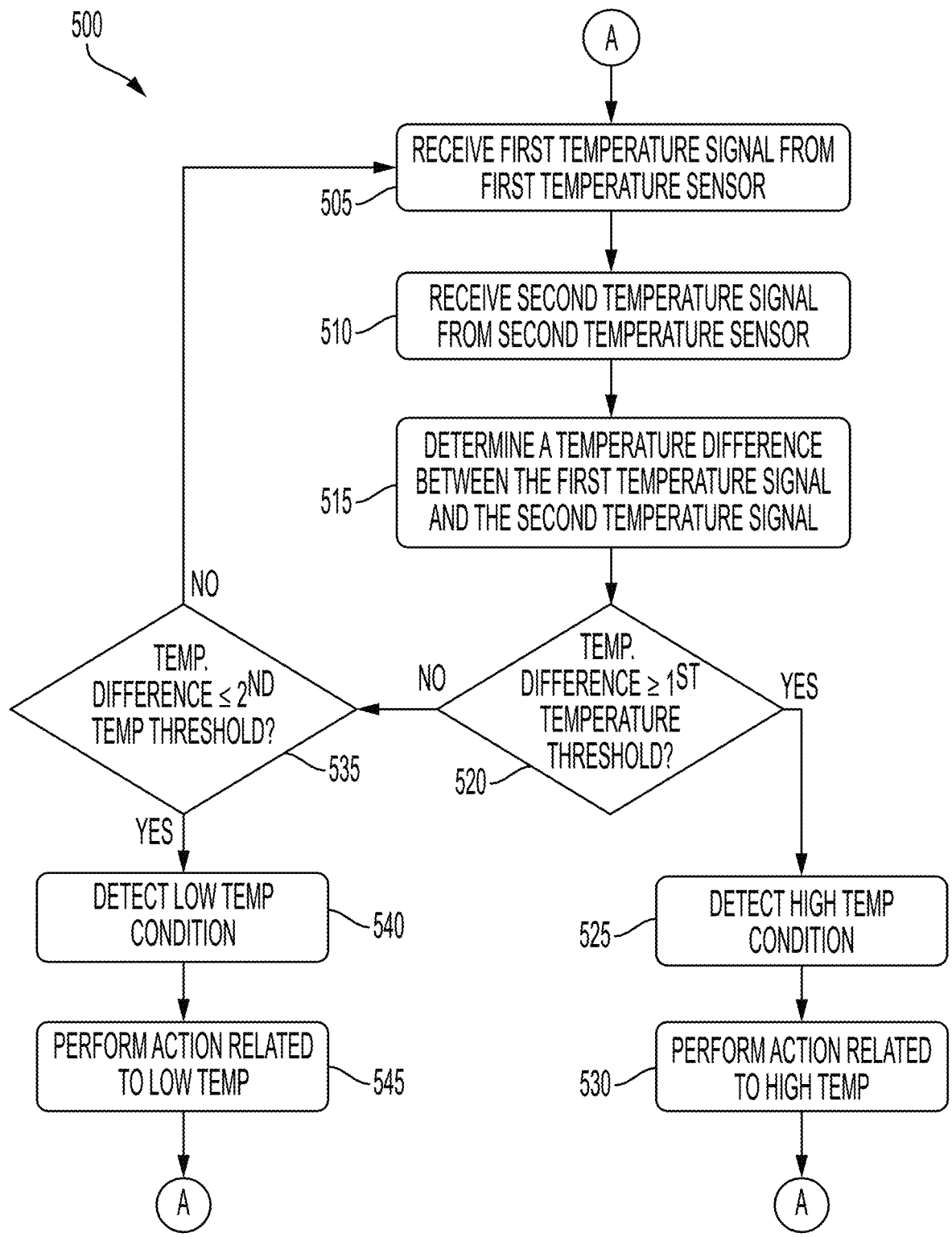
FIG. 5 illustrates a flow chart of a method performed by the controller of FIG. 2 in accordance with embodiments described herein.

As one example, FIG. 5 provides a method 500 for monitoring the temperature of the power tool 100. The method 500 may be performed by the power tool controller 200. The steps of the method 500 are described in an iterative manner for descriptive purposes. Various steps described herein with respect to the method 500 are capable of being executed simultaneously, in parallel, or in an order that differs from the illustrated serial and iterative manner of execution.

At block 505, the power tool controller 200 receives a first temperature signal from a first temperature sensor 275. The first temperature signal is indicative of a first temperature T1 of an electrical component monitored by the first temperature sensor 275. At block 510, the power tool controller 200 receives a second temperature signal from a second temperature sensor 275. The second temperature signal is indicative of a second temperature T2 of an electrical component monitored by the second temperature sensor 275. At block 515, the power tool controller 200 determines a temperature difference between the first temperature signal and the second temperature signal. For example, the power tool controller 200 may subtract the first temperature T1 from the second temperature T2 to determine temperature difference (e.g., T2−T1). In some instances, the power tool controller 200 determines a magnitude of the difference between the first temperature T1 and the second temperature T2.

Figure 6:
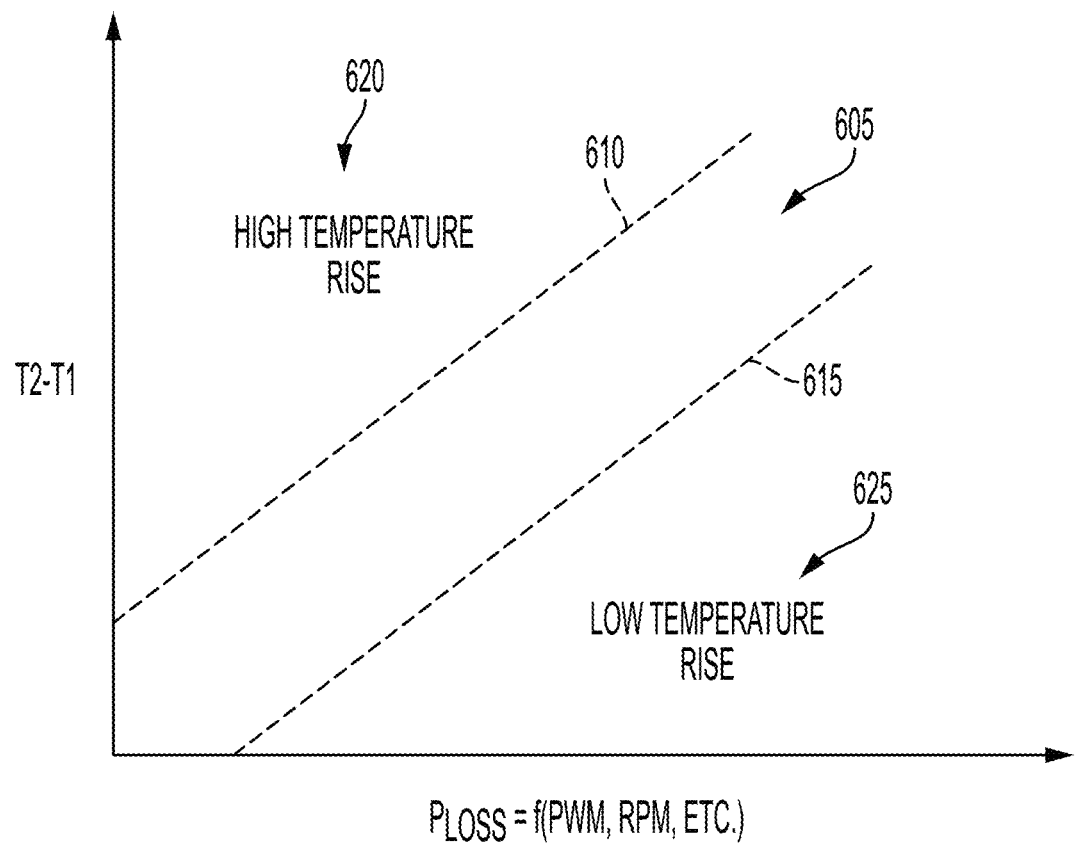
FIG. 6 illustrates a graph providing example temperature difference zones in accordance with embodiments described herein.

At block 520, the power tool controller 200 determines whether the temperature difference T2−T1 is greater than or equal to a first temperature difference threshold. In some instances, the first temperature difference threshold is a function based on two operating characteristics of the power tool 100. For example, FIG. 6 provides a graph 600 illustrating the temperature difference T2−T1 compared to the expected power loss, $P_{Loss}$, of the power tool 100 as a function of operating frequency (e.g., the operating PWM) of the switching network 255 and the operating speed (e.g., the RPM) of the motor 250. The graph 600 includes a normal operating temperature range 605 between a first temperature difference threshold 610 (e.g., a high temperature difference threshold) and a second temperature difference threshold 615 (e.g., a low temperature difference threshold). The first temperature difference threshold 610 and the second temperature difference threshold 615 are functions of the expected power loss of the power tool 100. In some embodiments, the temperature difference thresholds 610, 615 increase linearly based on the temperature difference and the expected power losses. In other embodiments, the temperature difference thresholds 610, 615 increase non-linearly based on the temperature difference and the expected power losses (e.g., according to a second-order or higher polynomial function, an exponential function, a logarithmic function, etc.). In some instances, the graph 600 corresponds to a look-up table that can be used to compare the temperature difference T2−T1 to the expected power loss $P_{Loss}$.

When the temperature difference T2−T1 is greater than or equal to the first temperature difference threshold ("YES" at block 520), the power tool controller 200 proceeds to block 525 and detects a high temperature condition. For example, with reference to FIG. 6, the temperature difference T2−T1 is located in the high temperature rise region 620. At block 530, the power tool controller 200 performs an action related to the high temperature condition. For example, the power tool controller 200 may control the indicator(s) 245 to provide a notification indicative of the high temperature condition. In some embodiments, the power tool controller 200 may limit or prevent a current provided to the motor 250 in response to the high temperature condition (e.g., reduce power, reduce speed, reduce PWM, brake the motor 250, etc.). After performing the action related to the high temperature condition, the power tool controller 200 may return to block 505 and continue monitoring temperature signals received from the first temperature sensor and the second temperature sensor.

Returning to block 520, when the temperature difference T2−T1 is less than the first temperature difference threshold ("NO" at block 520), the power tool controller 200 proceeds to block 535 and determines whether the temperature difference T2−T1 is less than or equal to a second temperature difference threshold. When the temperature difference T2−T1 is greater than the second temperature difference threshold ("NO" at block 535), the power tool controller 200 returns to block 505 and continues monitoring temperature signals received from the first temperature sensor and the second temperature sensor. For example, with reference to FIG. 6, the temperature difference T2−T1 is within the normal operating temperature range 605.

When the temperature difference T2−T1 is less than or equal to the second temperature difference threshold ("YES" at block 535), the power tool controller 200 proceeds to block 540 and detects a low temperature condition. For example, with reference to FIG. 6, the temperature difference T2−T1 is located in the low temperature rise region 625. At block 545, the power tool controller 200 performs an action related to the low temperature condition. For example, the power tool controller 200 may control the indicator(s) 245 to provide a notification indicative of the low temperature condition. After performing the action related to the low temperature condition, the power tool controller 200 may return to block 505 and continue monitoring temperature signals received from the first temperature sensor and the second temperature sensor.

Additionally, in some instances, after the temperature difference T2−T1 increases into the high temperature rise region 620 or decreases into the low temperature rise region 625, the temperature difference T2−T1 may return to the normal operating temperature range 605. In such an instance, the controller 200 may stop performing the action related to the high temperature condition or the action related to the low temperature condition. Additionally, in some implementations, the power tool controller 200 may log the high temperature condition and/or the low temperature condition in the memory 225. For example, the power tool controller 200 can count a number of high temperature rise warnings and a number of low temperature rise warnings. The number of high temperature rise warnings can indicate, for example, a clogged vent, poor air flow, failing components (e.g., electronic components, the motor 250, etc.). The low temperature rise warnings can, for example, indicate a missing housing, a cracked housing, etc.

Figure 7:
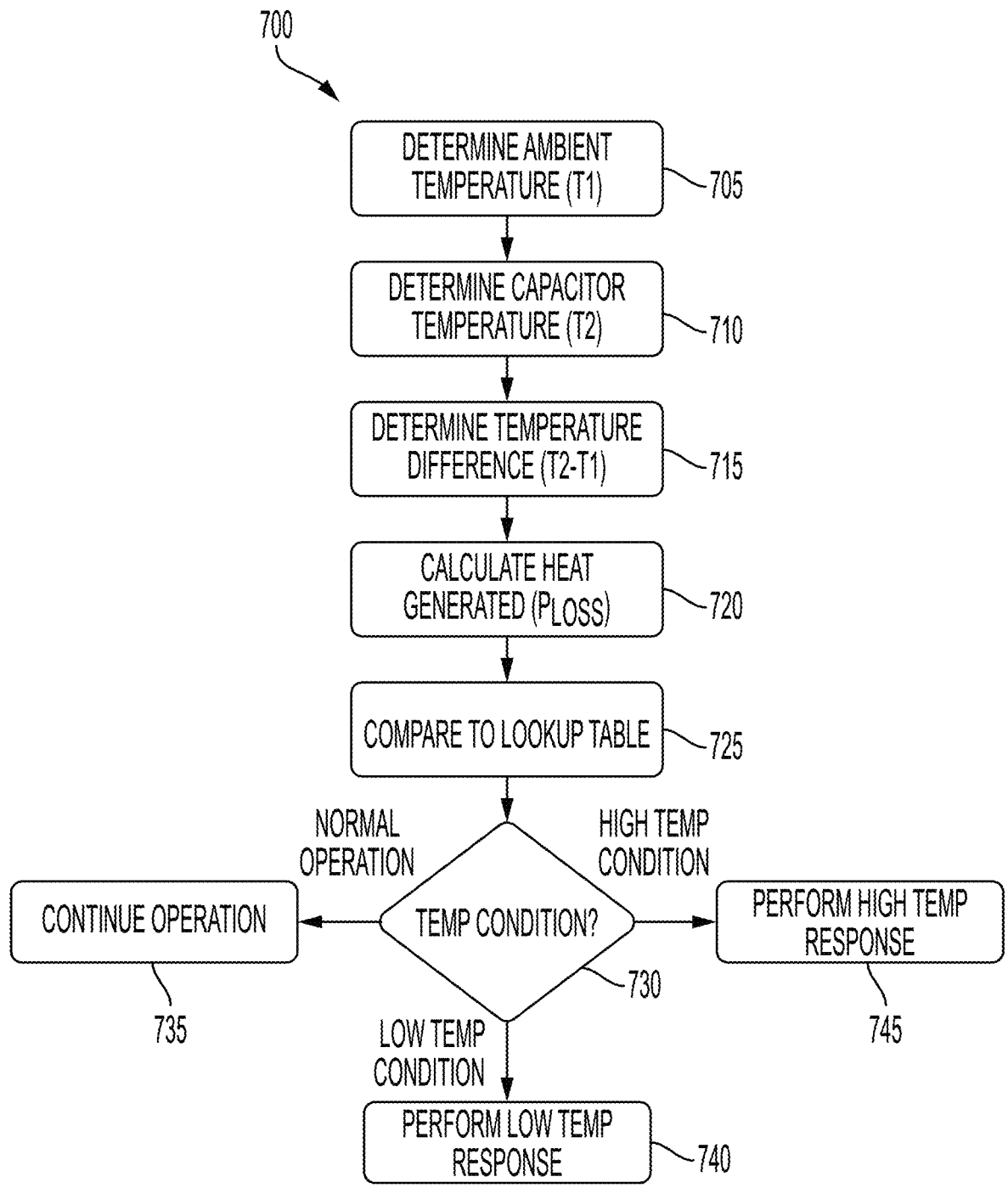
FIG. 7 illustrates a flow chart of a method performed by the controller of FIG. 2 in accordance with embodiments described herein.

As another example, FIG. 7 provides a method 700 for monitoring the temperature of a capacitor within the power tool 100. The method 700 may be performed by the power tool controller 200. The steps of the method 700 are described in an iterative manner for descriptive purposes. Various steps described herein with respect to the method 700 are capable of being executed simultaneously, in parallel, or in an order that differs from the illustrated serial and iterative manner of execution.

At block 705, the power tool controller 200 determines an ambient temperature T1. For example, the power tool controller 200 receives a temperature signal indicative of the ambient temperature T1 from a first temperature sensor 275. The power tool controller 200 determines the ambient temperature T1 based on the temperature signal. In some embodiments, the power tool controller 200 estimates the ambient temperature based on a signal from a first temperature sensor 275 (e.g., related to a temperature of a capacitor) upon startup of the power tool 100 (e.g., before the power tool experiences operation that may result in an increase in temperature).

At block 710, the power tool controller 200 determines a capacitor temperature T2 of a capacitor within the power tool 100. For example, the power tool controller 200 receives a temperature signal indicative of the temperature of a capacitor from a second temperature sensor 275. The power tool controller 200 determines the capacitor temperature T2 based on the temperature signal. At block 715, the power tool controller 200 determines a temperature difference between the first temperature signal and the second temperature signal. For example, the power tool controller 200 may subtract the first temperature T1 from the second temperature T2 to determine temperature difference (e.g., T2−T1). In some embodiments, the power tool controller 200 determines a magnitude of the difference between the first temperature T1 and the second temperature T2.

At block 720, the power tool controller 200 calculates or estimates an amount of heat that is generated by the power tool 100 (e.g., power loss, $P_{Loss}$). The heat generated by the power tool 100 may be calculated as a function of the operating PWM (e.g., frequency and duty cycle) of the switching network 255 and the RPM of the motor 250.

At block 725, the power tool controller 200 compares the temperature difference T2−T1 and the generated heat $P_{Loss}$ to a look-up table. For example, the power tool controller 200 compares the temperature difference T2−T1 and the generated heat, $P_{Loss}$, to the graph 600. At block 730, the power tool controller 200 determines the temperature condition of the capacitor based on the comparison. When the power tool controller 200 determines the temperature difference T2−T1 is within a normal operation range (for example, with reference to FIG. 6, the temperature difference T2−T1 is within the normal operating temperature range 605), the power tool controller 200 proceeds to block 735. At block 735, the power tool controller 200 continues normal operation of the power tool 100.

When the power tool controller 200 determines a low temperature condition (for example, with reference to FIG. 6, the temperature difference T2−T1 is located in the low temperature rise region 625), the power tool controller 200 proceeds to block 740. At block 740, the power tool controller 200 performs a low temperature response. For example, the power tool controller 200 logs the low temperature event in the power tool memory 225. The power tool controller 200 may provide an indication of the low temperature condition using the indicators 245.

When the power tool controller 200 determines a high temperature condition (for example, with reference to FIG. 6, the temperature difference T2−T1 is located in the high temperature rise region 620), the power tool controller 200 proceeds to block 745. At block 745, the power tool controller 200 performs a high temperature response. For example, the power tool controller 200 may limit current provided to the motor 250. In some embodiments, the power tool controller 200 logs the high temperature event in the power tool memory 225. The power tool controller 200 may provide an indication of the high temperature condition using the indicators 245.

In some embodiments, the power tool controller 200 uses statistics on the temperature difference T2−T1 and the individual temperatures (e.g., first temperature T1 and second temperature T2) to predict upcoming errors of the power tool 100. For example, the power tool controller 200 may observe two or more measured temperature values and determine the mean and/or standard deviation of these temperature values over a period of time.

Figure 8:
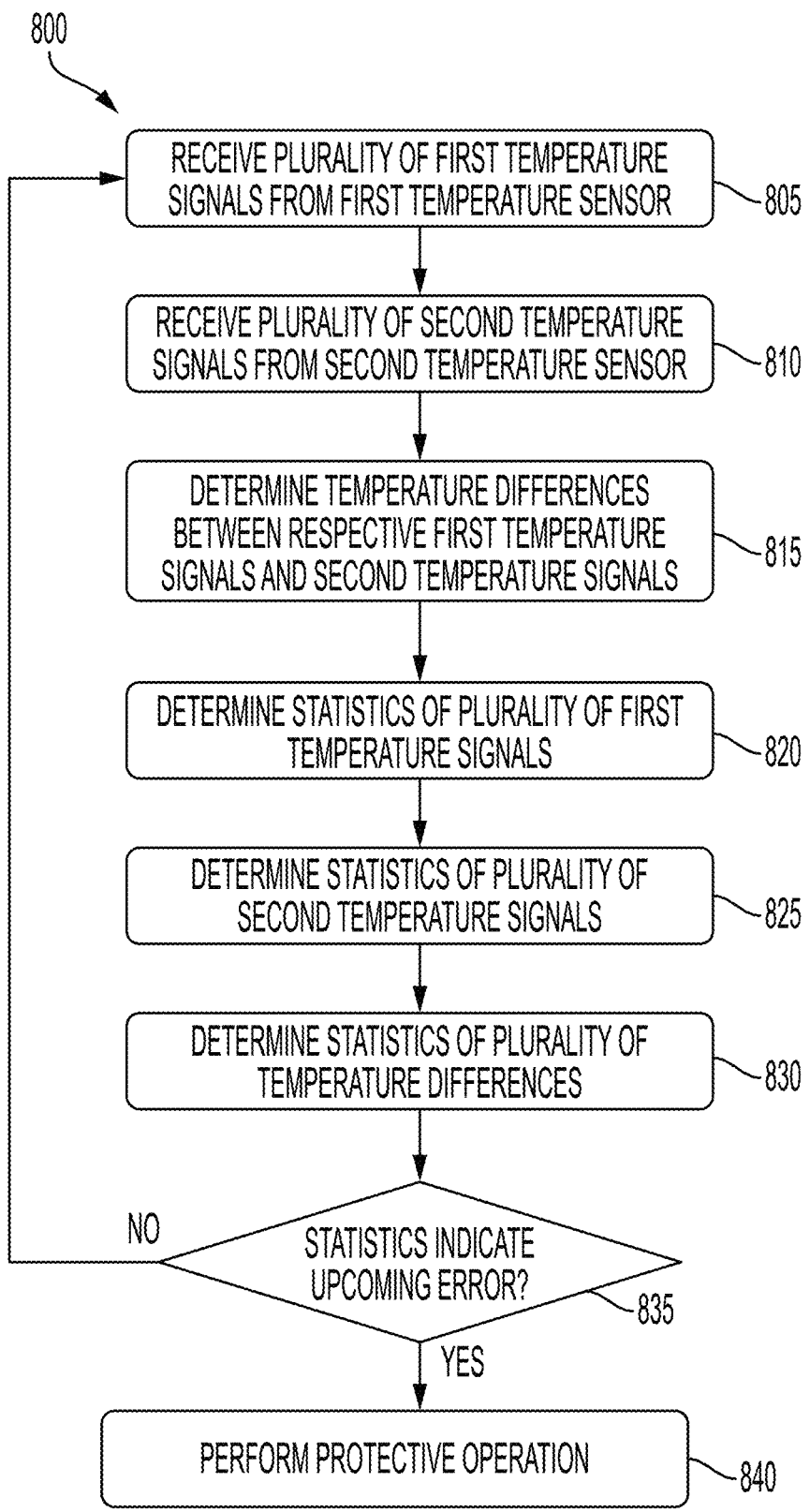
FIG. 8 illustrates a flow chart of a method performed by the controller of FIG. 2 in accordance with embodiments described herein.

FIG. 8 provides a method 800 for predicting errors of the power tool 100 based on temperature statistics. The method 800 may be performed by the power tool controller 200. The steps of the method 800 are described in an iterative manner for descriptive purposes. Various steps described herein with respect to the method 800 are capable of being executed simultaneously, in parallel, or in an order that differs from the illustrated serial and iterative manner of execution.

At block 805, the power tool controller 200 receives a plurality of first temperature signals from a first temperature sensor 275. For example, the power tool controller 200 may receive temperature signals from the plurality of temperature sensors 275 at set sampling intervals over a period of time. The plurality of first temperature signals may be two or more temperature samples received over a time period. At block 810, the power tool controller 200 receives a plurality of second temperature signals from a second temperature sensor 275.

At block 815, the power tool controller 200 determines temperature differences between respective first temperature signals and second temperature signals. For example, each temperature signal may be associated with a timestamp at which the temperature signal was received. The power tool controller 200 may determine temperature differences between first temperature signals and second temperature signals with the same (or approximately the same) timestamps.

At block 820, the power tool controller 200 determines statistics of the plurality of first temperature signals. For example, the power tool controller 200 may determine the mean of the plurality of first temperature signals, may determine a standard deviation of the plurality of first temperature signals, or the like. At block 825, the power tool controller 200 determines statistics of the plurality of second temperature signals. For example, the power tool controller 200 may determine the mean of the plurality of second temperature signals, may determine a standard deviation of the plurality of second temperature signals, or the like. At block 830, the power tool controller 200 determines statistics of the plurality of temperature differences. For example, the power tool controller 200 may determine the mean of the plurality of temperature differences, may determine a standard deviation of the plurality of temperature differences, or the like. In some embodiments, only one or more of blocks 820, 825, and 830 are executed. In other embodiments, all of blocks 820, 825, and 830 are executed.

Figure 9:
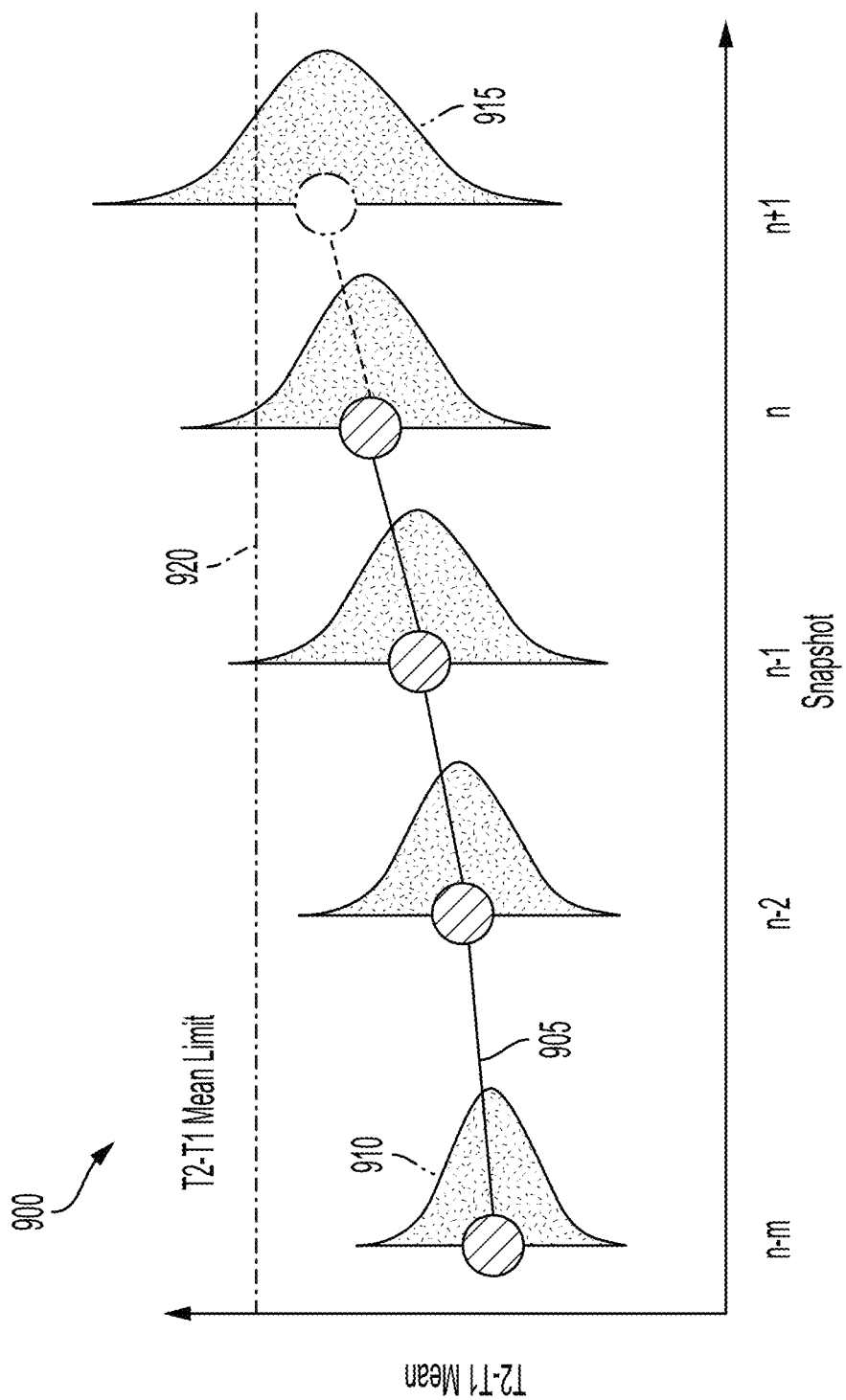
FIG. 9 illustrates a graph providing example temperature statistics in accordance with embodiments described herein.

As an illustrative example, FIG. 9 provides an example graph 900 illustrating the temperature difference T2−T1 statistics over a sampling period. Particularly, the graph 900 illustrates the mean 905 (e.g., a running mean) of the temperature difference T2−T1 over a period of n-m samples to n+1 samples, where n is the current sample and m is a previous stored sample value. Each mean 905 can include a corresponding standard deviation 910. In some embodiments, one to three previous values are used to predict the trend in FIG. 9.

Returning to FIG. 8, at block 835, the power tool controller 200 determines whether the statistics of the plurality of first temperature signals, the plurality of second temperature signals, and/or the plurality of temperature differences indicate an upcoming or predicted error of the power tool 100. When the statistics do not indicate an upcoming or predicted error of the power tool 100 ("NO" at block 835), the power tool controller 200 returns to block 805. When the statistics do indicate an upcoming error of the power tool 100 ("YES" at block 835), the power tool controller 200 proceeds to block 840 and performs a protective operation. For example, with reference to FIG. 9, a predicted next standard deviation 915 value at time n+1 may be above a mean/standard deviation limit 920 (e.g., by a statistically significant value or threshold), or a particular magnitude of the mean 905 may be above the mean/standard deviation limit 920. The protective operation may be, for example, limiting a current provided to the motor 250 (e.g., reduce power, reduce speed, reduce PWM, brake the motor 250, etc.), controlling the indicators 245 to provide a notification, or the like.

Figure 10:
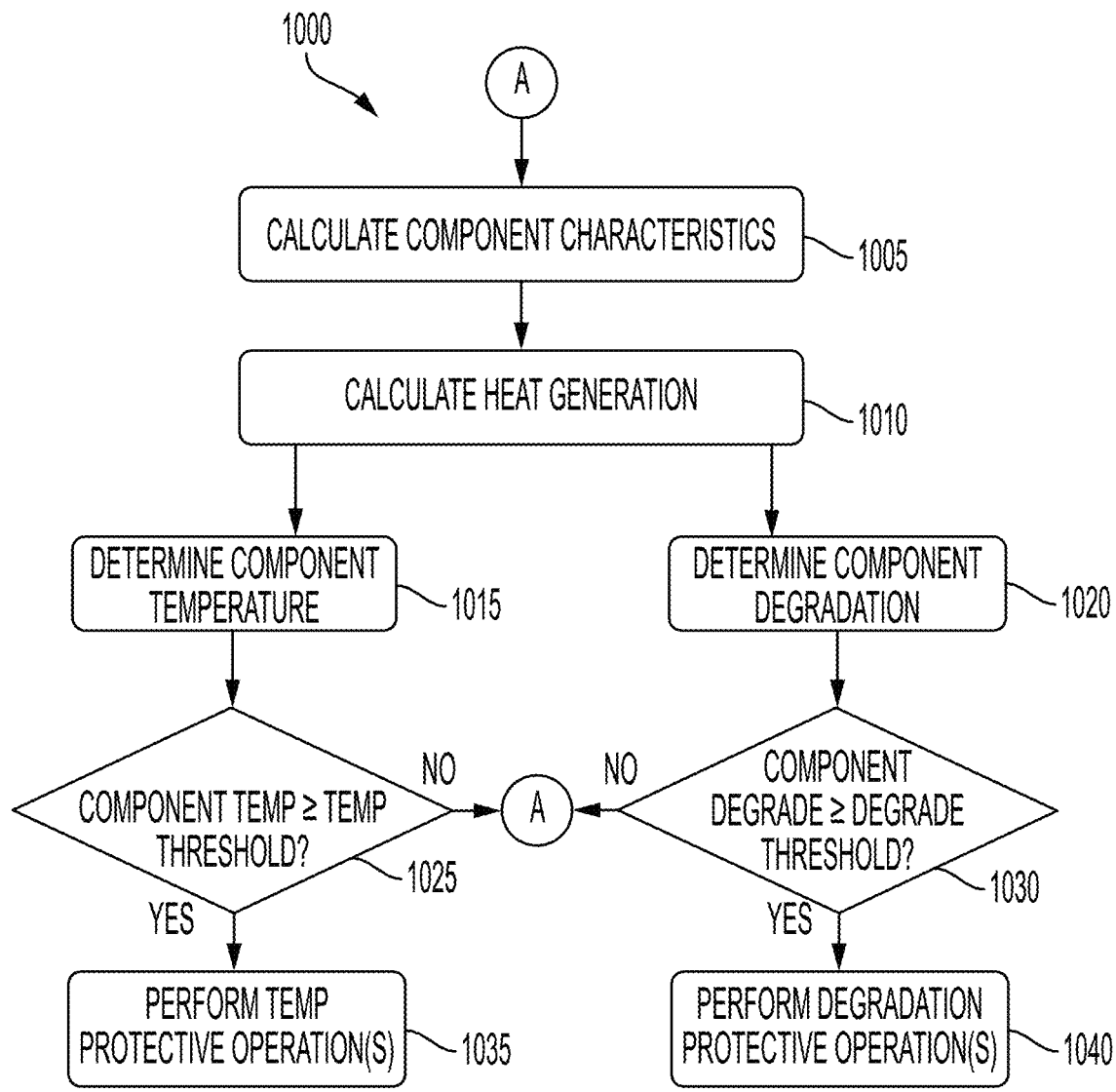
FIG. 10 illustrates a flow chart of a method performed by the controller of FIG. 2 in accordance with embodiments described herein.

FIG. 10 provides a method 1000 for monitoring both temperature and degradation of components within the power tool 100. The method 1000 may be performed by the power tool controller 200. The steps of the method 1000 are described in an iterative manner for descriptive purposes. Various steps described herein with respect to the method 1000 are capable of being executed simultaneously, in parallel, or in an order that differs from the illustrated serial and iterative manner of execution.

At block 1005, the power tool controller 200 calculates component characteristics of components within the power tool 100. For example, the power tool controller 200 may calculate component characteristics of a capacitor or a switch (e.g., a FET) within the power tool 100. The component characteristics may include aging characteristics of the component. The aging characteristics may be an equivalent series resistance of the component determined based on usage time of the power tool 100. In some embodiments, the usage time of the power tool 100 is compared to a curve fit function or a lookup table to determine the aging characteristics. In some embodiments, the component characteristics include a temperature of the component or statistics related to the temperature of the component, as previously described.

At block 1010, the power tool controller 200 calculates heat generation of the component. For example, the power tool controller 200 may determine I²R losses of the component, may determine heat generation of the component as a function of operating PWM of the switching network 255 and the RPM of the motor 250, and the like.

At block 1015, the power tool controller 200 determines the temperature of the component. For example, the power tool controller 200 receives a temperature signal from a temperature sensor 275 associated with the component. The power tool controller 200 determines the temperature of the component based on the temperature signal. At block 1025, the power tool controller 200 compares the component temperature to a temperature threshold. When the component temperature is less than the temperature threshold ("NO" at block 1025), the power tool controller 200 returns to block 1005 and continues to monitor the component characteristics. When the component temperature is greater than or equal to the temperature threshold ("YES" at block 1025), the power tool controller 200 proceeds to block 1035 and performs temperature protective operations. For example, the power tool controller 200 may reduce the current provided to the motor 250, adjust motor control parameters for driving the motor 250 (for example, reducing the PWM of the switching network 255), may provide an indication via the indicators 245, stop operation of the motor 250, and the like.

Concurrently, at block 1020, the power tool controller 200 determines degradation of the component. In some embodiments, the component degradation is calculated using Miner's rule, as provided in Equation 1:

$$D = \sum_{i=0}^{m} \frac{t_i}{t_{max,i}} \qquad \text{[Equation 1]}$$

where:
D=Component Degradation;
t=Cumulative Time Component is at Temperature $T_i$; and
$t_{max,i}$=Maximum Time Component is Allowed at Temperature $T_i$.

The rolling average rate of degradation can be calculated and stored in the power tool memory 225 using, for example, Equation 2:

$$\Delta D = \Delta D_{i-1} + \frac{t_{update}}{t_{period} + t_{update}} \cdot [(D_i - D_{i-1}) + \Delta D_{i-1}] \qquad \text{[Equation 2]}$$

where:
ΔD=Rolling Average Rate of Degradation;
$t_{update}$=Update Time for Degradation Calculation; and
$t_{period}$=Duration of Rolling Average.

Provided a degradation limit L (e.g., 0.9 or 90%, 90 days, etc.), the remaining time until the degradation limit is passed may be calculated using Equation 3:

$$t_r = \frac{L - D}{\Delta D} \qquad \text{[Equation 3]}$$

where:
$t_r$=Remaining Time; and
L=Degradation Limit.

At block 1030, the power tool controller 200 compares the component degradation D to a degradation threshold (for example, the degradation limit L or a degradation value below the degradation limit L). When the component degradation D is less than the degradation threshold ("NO" at block 1030), the power tool controller 200 returns to block 1005 and continues to monitor the component characteristics. When the component degradation D is greater than or equal to the degradation threshold ("YES" at block 1030), the power tool controller 200 continues to block 1040 and performs degradation protective operations. For example, the power tool controller 200 may estimate when the degradation will hit the degradation limit, may determine which components within the power tool 100 need to be replaced, and may provide indications via the indicators 245 to indicate the degradation of the component.

Figure 11A:
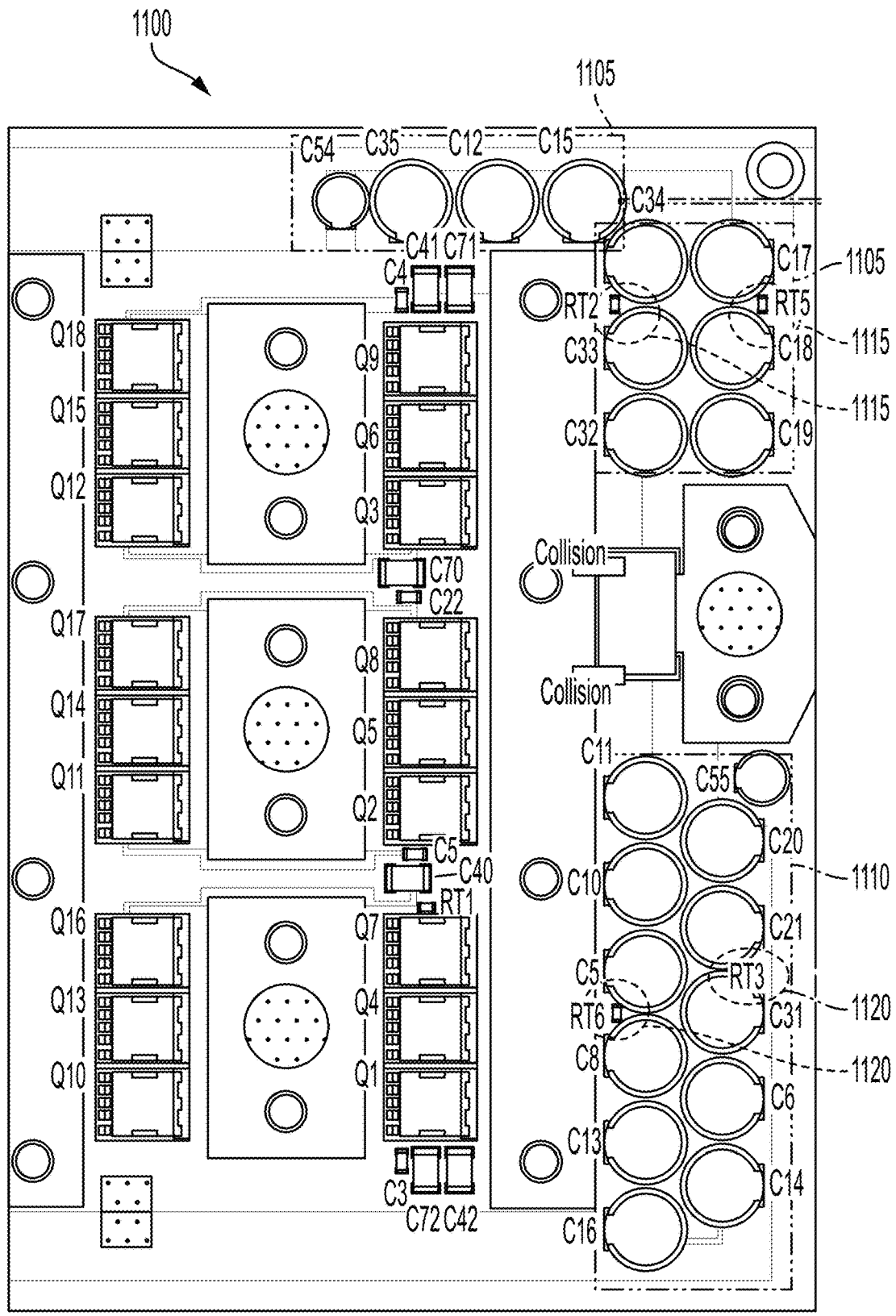
FIG. 11A illustrates a top view of bus capacitors including associated temperature sensors in accordance with embodiments described herein.
Figure 11B:
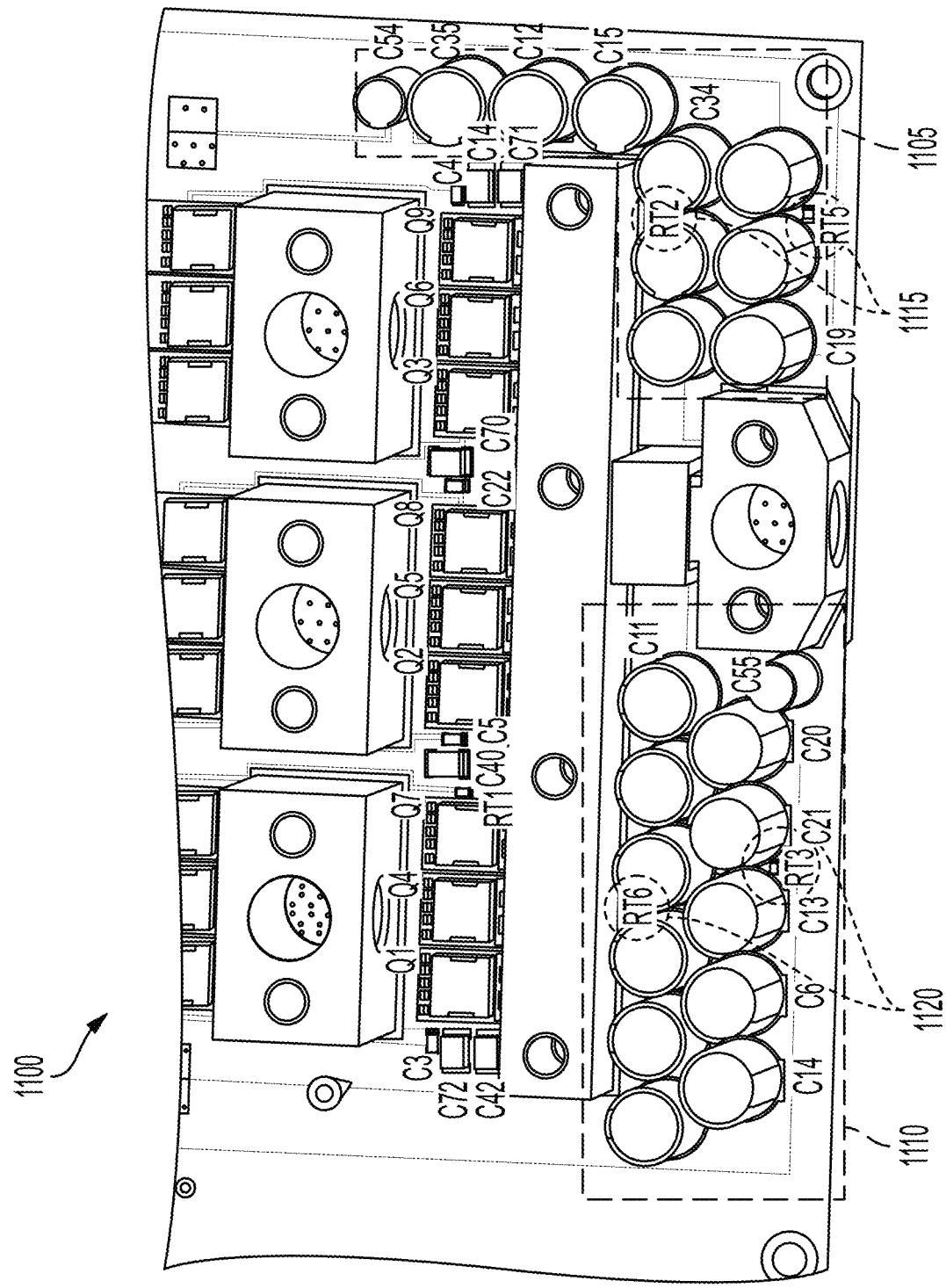
FIG. 11B illustrates a perspective view of the bus capacitors of FIG. 11A in accordance with embodiments described herein.

FIGS. 11A-11B illustrate another example of implementing temperature sensors in the power tool 100. FIGS. 11A-11B provide an example circuit board 1100 having a first plurality of DC bus capacitors 1105 and a second plurality of DC bus capacitors 1110. A first set of temperature sensors 1115 are provided adjacent to the first plurality of DC bus capacitors 1105, and a second set of temperature sensors 1120 are provided adjacent to the second plurality of DC bus capacitors 1110. Temperatures sensors included in the first set of temperature sensors 1115 and the second set of temperature sensors 1120 may be used for implementing the method 500, the method 700, the method 800, and/or the method 1000.

Representative Features

Representative features are set out in the following clauses, which stand alone or may be combined, in any combination, with one or more features disclosed in the text and/or drawings of the specification.

Clause 1. A power tool device comprising: a first electrical component; a second electrical component; an indication device; a first temperature sensor configured to sense a temperature of the first electrical component; a second temperature sensor configured to sense a temperature of the second electrical component; and a controller connected to the first temperature sensor and the second temperature sensor, the controller configured to: determine a temperature difference between a first temperature value associated with the first temperature sensor and a second temperature value associated with the second temperature sensor, compare the temperature difference to a temperature difference threshold, and provide, in response to the temperature difference satisfying the temperature difference threshold, a notification using the indication device.

Clause 2. The power tool device of clause 1, wherein: the power tool device is a power tool; the first electrical component is a motor; and the second electrical component is a switching network configured to drive the motor.

Clause 3. The power tool device of clause 2, wherein the controller is further configured to limit, in response to the temperature difference satisfying the temperature difference threshold, current provided to the motor.

Clause 4. The power tool device of any of the preceding clauses, wherein: the temperature difference threshold is a high temperature threshold, and the notification is indicative of a high temperature condition.

Clause 5. The power tool device of any of clauses 1-3, wherein: the temperature difference threshold is a low temperature threshold; and the notification is indicative of a low temperature condition.

Clause 6. The power tool device of any of the preceding clauses, wherein the controller is further configured to: determine a running mean of the first temperature value and the second temperature value over a time period; determine a standard deviation of the first temperature value and the second temperature value over the time period; and predict an error of the power tool device based on the running mean and the standard deviation of the first temperature value and the second temperature value over the time period.

Clause 7. The power tool device of any of the preceding clauses, wherein the controller is further configured to: determine a running mean of the temperature difference over time; determine a standard deviation of the temperature difference over a time period; and predict an error of the power tool device based on the running mean and the standard deviation of the temperature difference over the time period.

Clause 8. The power tool device of any of the preceding clauses, wherein: the first electrical component is a first direct current ("DC") bus capacitor; and the second electrical component is a second DC bus capacitor.

Clause 9. The power tool device of any of the preceding clauses, wherein the controller is further configured to: determine a degradation value of the first electrical component; compare the degradation value of the first electrical component to a degradation threshold; and provide, in response to the degradation value satisfying the degradation threshold, a second notification using the indication device.

Clause 10. A power tool device comprising: an electrical component; an indication device; a first temperature sensor configured to sense an ambient temperature; a second temperature sensor configured to sense a temperature of the electrical component; and a controller connected to the first temperature sensor and the second temperature sensor, the controller configured to: determine a temperature difference between a first temperature value associated with the first temperature sensor and a second temperature value associated with the second temperature sensor, calculate an amount of heat generated by the electrical component, compare the temperature difference and the amount of heat generated by electrical component to a look-up table, and provide, in response to the comparison indicating an abnormal temperature condition of the electrical component, a notification using the indication device.

Clause 11. The power tool device of clause 10, wherein the electrical component is a capacitor.

Clause 12. The power tool device of any of clauses 10-11, further comprising: a motor; a battery pack; and a switching network configured to provide power from the battery pack to the motor, wherein the controller is configured to calculate the amount of heat generated by the electrical component based on a function of an operating frequency of the switching network.

Clause 13. The power tool device of clause 12, wherein the controller is further configured to limit, in response to the comparison indicating an abnormal temperature condition, current provided to the motor.

Clause 14. The power tool device of clause 12, wherein the controller is configured to calculate the amount of heat generated by the electrical component based further on an operating speed of the motor.

Clause 15. The power tool device of any of clauses 10-14, wherein the controller is further configured to log the abnormal temperature condition of the electrical component in a memory.

Clause 16. The power tool device of any of clauses 10-15, wherein to determine a temperature difference between a first temperature value associated with the first temperature sensor and a second temperature value associated with the second temperature sensor, the controller is configured to estimate the ambient temperature upon a startup of the power tool device.

Clause 17. A method for controlling a power tool, the method comprising: determining a temperature difference between a first temperature value associated with a first temperature sensor and a second temperature value associated with a second temperature sensor, wherein the first temperature sensor is configured to sense an ambient temperature, and wherein the second temperature sensor is configured to sense a temperature of an electrical component; calculating an amount of heat generated by the electrical component; comparing the temperature difference and the amount of heat generated by the electrical component to a look-up table; and providing, in response to the comparison indicating an abnormal temperature condition of the electrical component, a notification using an indication device.

Clause 18. The method of clause 17, wherein calculating the amount of heat generated by the electrical component is based on a function of an operating frequency of a switching network used to control a motor.

Clause 19. The method of clause 18, wherein the method includes limiting, in response to the comparison indicating an abnormal temperature condition, current provided to the motor.

Clause 20. The method of any of clauses 18-19, wherein calculating the amount of heat generated by the electrical component is based further on an operating speed of the motor.

Thus, embodiments provided herein describe, among other things, systems and methods for implementing a plurality of temperature sensors in power tools. Various features and advantages are set forth in the following claims.

What is claimed is:

1. A power tool device comprising:
a first electrical component;
a second electrical component;
an indication device;
a first temperature sensor configured to sense a temperature of the first electrical component;
a second temperature sensor configured to sense a temperature of the second electrical component; and
a controller connected to the first temperature sensor and the second temperature sensor, the controller configured to:
determine a temperature difference between a first temperature value associated with the first temperature sensor and a second temperature value associated with the second temperature sensor,
compare the temperature difference to a temperature difference threshold, and
provide, in response to the temperature difference satisfying the temperature difference threshold, a notification using the indication device.

2. The power tool device of claim 1, wherein:
the power tool device is a power tool;
the first electrical component is a motor; and
the second electrical component is a switching network configured to drive the motor.

3. The power tool device of claim 2, wherein the controller is further configured to:
limit, in response to the temperature difference satisfying the temperature difference threshold, current provided to the motor.

4. The power tool device of claim 1, wherein:
the temperature difference threshold is a high temperature threshold, and
the notification is indicative of a high temperature condition.

5. The power tool device of claim 1, wherein:
the temperature difference threshold is a low temperature threshold; and
the notification is indicative of a low temperature condition.

6. The power tool device of claim 1, wherein the controller is further configured to:

determine a first running mean of the first temperature value and a second running mean of the second temperature value over a time period;
determine a first standard deviation of the first temperature value and a second standard deviation of the second temperature value over the time period; and
predict an error of the power tool device based on the first running mean, the second running mean, the first standard deviation, and the second standard deviation.

7. The power tool device of claim 1, wherein the controller is further configured to:
determine a running mean of the temperature difference over a time period;
determine a standard deviation of the temperature difference over the time period; and
predict an error of the power tool device based on the running mean and the standard deviation of the temperature difference over the time period.

8. The power tool device of claim 1, wherein:
the first electrical component is a first direct current ("DC") bus capacitor; and
the second electrical component is a second DC bus capacitor.

9. The power tool device of claim 1, wherein the controller is further configured to:
determine a degradation value of the first electrical component;
compare the degradation value of the first electrical component to a degradation threshold; and
provide, in response to the degradation value satisfying the degradation threshold, a second notification using the indication device.

10. A power tool device comprising:
an electrical component;
an indication device;
a first temperature sensor configured to sense an ambient temperature;
a second temperature sensor configured to sense a temperature of the electrical component; and
a controller connected to the first temperature sensor and the second temperature sensor, the controller configured to:
determine a temperature difference between a first temperature value associated with the first temperature sensor and a second temperature value associated with the second temperature sensor,
calculate an amount of heat generated by the electrical component,
compare the temperature difference and the amount of heat generated by the electrical component to a look-up table, and
provide, in response to the comparison indicating an abnormal temperature condition of the electrical component, a notification using the indication device.

11. The power tool device of claim 10, wherein the electrical component is a capacitor.

12. The power tool device of claim 10, wherein the power tool device is a power tool, the power tool device further comprising:
a motor;
a battery pack; and
a switching network configured to provide power from the battery pack to the motor, wherein the controller is configured to calculate the amount of heat generated by the electrical component based on a function of an operating frequency of the switching network.

13. The power tool device of claim 12, wherein the controller is further configured to limit, in response to the comparison indicating the abnormal temperature condition, current provided to the motor.

14. The power tool device of claim 12, wherein the controller is configured to calculate the amount of heat generated by the electrical component based further on an operating speed of the motor.

15. The power tool device of claim 10, wherein the controller is further configured to log the abnormal temperature condition of the electrical component in a memory.

16. The power tool device of claim 10, wherein, to determine the temperature difference between the first temperature value associated with the first temperature sensor and the second temperature value associated with the second temperature sensor, the controller is configured to estimate the ambient temperature upon a startup of the power tool device.

17. A method for controlling a power tool device, the method comprising:
  determining a temperature difference between a first temperature value associated with a first temperature sensor and a second temperature value associated with a second temperature sensor, wherein the first temperature sensor is configured to sense an ambient temperature, and wherein the second temperature sensor is configured to sense a temperature of an electrical component;
  calculating an amount of heat generated by the electrical component;
  comparing the temperature difference and the amount of heat generated by the electrical component to a look-up table; and
  providing, in response to the comparison indicating an abnormal temperature condition of the electrical component, a notification using an indication device.

18. The method of claim 17, wherein calculating the amount of heat generated by the electrical component is based on a function of an operating frequency of a switching network used to control a motor.

19. The method of claim 18, further comprising:
  limiting, in response to the comparison indicating the abnormal temperature condition, current provided to the motor.

20. The method of claim 18, wherein calculating the amount of heat generated by the electrical component is based further on an operating speed of the motor.

* * * * *